(12) United States Patent
Wang et al.

(10) Patent No.: US 10,271,218 B2
(45) Date of Patent: Apr. 23, 2019

(54) ENABLE ACCESS POINT AVAILABILITY PREDICTION

(71) Applicant: Hewlett Packard Enterprise Development LP, Houston, TX (US)

(72) Inventors: Shuai Wang, Beijing (CN); Jun Qing Xie, Beijing (CN); Xiaofeng Yu, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/579,533

(22) PCT Filed: Jun. 4, 2015

(86) PCT No.: PCT/CN2015/080778
§ 371 (c)(1),
(2) Date: Dec. 4, 2017

(87) PCT Pub. No.: WO2016/192081
PCT Pub. Date: Dec. 8, 2016

(65) Prior Publication Data
US 2018/0152849 A1 May 31, 2018

(51) Int. Cl.
*G01S 5/02* (2010.01)
*H04L 12/24* (2006.01)
(Continued)

(52) U.S. Cl.
CPC .......... *H04W 16/18* (2013.01); *G01S 5/0252* (2013.01); *H04L 41/145* (2013.01);
(Continued)

(58) Field of Classification Search
CPC ...... H04W 64/00; H04W 48/20; H04W 88/06
See application file for complete search history.

(56) References Cited

U.S. PATENT DOCUMENTS 8,364,613 B1 1/2013 Lin et al.
8,599,758 B1 12/2013 Ogale et al.
(Continued)

FOREIGN PATENT DOCUMENTS

CN 104093203 A 10/2014
CN 104302000 A 1/2015
(Continued)

OTHER PUBLICATIONS

Gianni A. Di Caro et al, "Online Supervised Incremental Learning of Link Quality Estimates in Wireless Networks", Jul. 1, 2013, 8 Pgs.
(Continued)

*Primary Examiner* — Diane D Mizrahi
(74) *Attorney, Agent, or Firm* — Mannava & Kang, P.C.

(57) ABSTRACT

In an example, a set of training fingerprints may be access, in which each of the training fingerprints may specify an access point of a plurality of access points to which a mobile device made a successful connection and a cellular signal strength of a cellular tower near the client device when the successful connection was made. An interim model may be generated from the accessed set of training fingerprints, in which the interim model may contain a subset of the information in the set of training fingerprints to enable a destination device to generate a prediction model to predict an availability of an access point. The generated interim model may be transferred to the destination device.

8 Claims, 11 Drawing Sheets

SAMPLE INTERIM MODEL A
400

```
38:22:d6:48:b0:50,2437, week1, week10,34
LEVEL4,19835, 29 ,2
19835,0,0,0,0,0,0,0,0,0,0,0,0,0,0,0,0,0,0,0,0,0,0,0,29,0,0,0,0,0,0,0,0
10009,0,0,0,0,0,0,0,0,0,0,0,0,0,0,0,0,0,0,0,0,2,14,10,3,0,0,0,0,0,0,0,0
```

SAMPLE INTERIM MODEL B
410

```
38:22:d6:48:b0:50,2437, week11, week12,34
LEVEL4,19835, 20 ,3
19835,0,0,0,0,0,0,0,0,0,0,0,0,0,0,0,0,0,0,0,0,0,0,0,2,18,0,0,0,0,0,0,0,0
10009,0,0,0,0,0,0,0,0,0,0,0,0,0,0,0,0,0,0,0,1,10,8,1,0,0,0,0,0,0,0,0,0
10008, 18 ,0,0,0,0,0,0,0,0,0,0,0,0,0,0,0,0,0,0,2,0,0,0,0,0,0,0,0,0,0,0
```

(51) Int. Cl.
*H04W 16/18* (2009.01)
*H04W 48/16* (2009.01)
*H04W 48/20* (2009.01)
*H04W 64/00* (2009.01)
*H04W 88/06* (2009.01)
*H04W 88/08* (2009.01)

(52) U.S. Cl.
CPC ........... *H04L 41/147* (2013.01); *H04W 48/16* (2013.01); *H04W 48/20* (2013.01); *H04W 64/00* (2013.01); *H04W 88/06* (2013.01); *H04W 88/08* (2013.01)

(56) References Cited

U.S. PATENT DOCUMENTS

| | | | | |
|---|---|---|---|---|
| 8,934,921 | B2 * | 1/2015 | Marti | G01C 21/10 455/456.2 |
| 8,977,298 | B2 * | 3/2015 | Marti | G01S 5/0252 370/328 |
| 2012/0185415 | A1 | 7/2012 | Chenthamarakshan et al. | |
| 2014/0171098 | A1 * | 6/2014 | Marti | G01S 5/0252 455/456.1 |
| 2014/0171114 | A1 * | 6/2014 | Marti | G01C 21/10 455/456.2 |
| 2014/0171118 | A1 * | 6/2014 | Marti | G01S 5/0252 455/456.3 |
| 2015/0103806 | A1 | 4/2015 | Kuusilinna et al. | |

FOREIGN PATENT DOCUMENTS

| | | |
|---|---|---|
| EP | 2224769 | 9/2010 |
| EP | 2826319 | 9/2013 |
| WO | WO-2013/175048 A1 | 11/2013 |

OTHER PUBLICATIONS

International Searching Authority, The International Search Report and the Written Opinion, dated Feb. 29, 2016, PCT/CN2015/080778, 11 Pgs.

Jaechang Nam, et al, "Transfer Defect Learning", Mar. 8, 2013, 10 Pgs.

Tao Liu et al, "Data-Driven Link Quality Prediction Using Link Features", Feb. 2014, 35 Pgs.

* cited by examiner

TABLE
300

| FP | TIME; RegCell-ID,RSS; All <Cell-ID,RSS> pairs; AP-SSID, AP-BSSID, AP-Channel, AP-RSS |
|----|---|
| #1 | 1411874170408;1507,-63;1507,-63,19836,-69,16893,-73,16891,-61,13579,-81,5997,-77,1508,-79;CMCC,38:22:d6:48:b0:50,2437,-91 |
| #2 | 14118741714 50;1507,-63;1507,-63,19836,-71,16893,-71,16891,-61,10007,-81,5997,-75,1508,-79;CMCC,38:22:d6:48:b0:50,2437,-91 |
| #3 | 14118741754 38;1507,-63;1507,-63,19836,-71,16893,-73,16891,-59,13579,-81,1508,-81,1506,-79;CMCC,38:22:d6:48:b0:50,2437,-91 |
| ... | ... |

*FIG. 3A*

TABLE
310

38:22:d6:48:b0:50,2437, 141187417O408, 14118945501S5,34 → THIS LINE INDICATES INTERIM MODEL'S META INFORMATION

LEVEL4,19835,29,8 → SUB-REGION 19835 COMPACTS 29 RECORDS OF RAW FINGERPRINTS INTO 8 LINES OF CELL-ID DISTRIBUTION ARRAYS
19835,0,0,0,0,0,0,0,0,0,0,0,0,0,0,0,0,0,0,0,0,0,0,0,0,0,0,0,0,0,2,14,10,3,0,0,0,0,0,0,0,0,0
10009,0,0,0,0,0,0,0,0,0,0,0,0,0,0,0,0,0,0,0,0,0,0,0,0,0,0,0,0,0,0,7,4,1,9,3,5,0,0,0,0,0,0
5997,0,0,0,0,0,0,0,0,0,0,0,0,0,0,0,0,0,0,0,0,0,0,0,0,0,0,0,0,0,0,0,0,0,5,3,9,8,4,0
10008,0,0,0,0,0,0,0,0,0,0,0,0,0,0,0,0,0,0,0,0,0,0,0,0,0,0,0,0,0,0,0,0,0,0,0,0,0,0,0
5999,26,0,0,0,0,0,0,0,0,0,0,0,0,0,0,0,0,0,0,0,0,0,0,0,0,0,0,0,3,0,0,0,0,0,0,0,0,0,0,0
5000,3,0,0,0,0,0,0,0,0,0,0,0,0,0,0,0,0,0,0,0,0,0,0,0,0,0,0,0,3,11,5,2,0,5,0,0,0,0,0
5998,0,0,0,0,0,0,0,0,0,0,0,0,0,0,0,0,0,0,0,0,0,0,0,0,0,0,0,0,0,0,0,0,0,2,0,8,19
11174,0,0,0,0,0,0,0,0,0,0,0,0,0,0,0,0,0,0,0,0,0,0,0,0,0,0,0,0,0,3,4,13,9,0,0,0,0,0,0

LEVEL4,10008,39,9 → SUB-REGION 10008 COMPACTS 39 RECORDS OF RAW FINGERPRINTS INTO 9 LINES OF CELL-ID DISTRIBUTION ARRAYS
13579,38,0,0,0,0,0,0,0,0,0,0,0,0,0,0,0,0,0,0,0,0,0,0,0,0,0,0,0,0,0,0,0,0,0,0,0,0,0,0,0
10009,1,0,0,0,0,0,0,0,0,0,0,0,0,0,0,0,0,0,0,0,0,0,0,0,0,0,0,0,6,3,5,21,3,0,0,0,0,0,0,0
5997,0,0,0,0,0,0,0,0,0,0,0,0,0,0,0,0,0,0,0,0,0,0,0,0,0,0,0,0,0,6,3,13,3,6,8,0,0,0
10008,0,0,0,0,0,0,0,0,0,0,0,0,0,0,0,0,0,0,0,0,0,0,0,0,0,0,0,0,0,0,0,0,0,0,0,0,0,39
5000,1,0,0,0,0,0,0,0,0,0,0,0,0,0,0,0,0,0,0,0,0,0,0,0,0,0,3,0,17,18,0,0,0,0,0,0,0,0,0
5999,38,0,0,0,0,0,0,0,0,0,0,0,0,0,0,0,0,0,0,0,0,0,0,0,0,0,0,0,0,0,1,0,0,0,0,0,0,0,0
5998,0,0,0,0,0,0,0,0,0,0,0,0,0,0,0,0,0,0,0,0,0,0,0,0,0,0,0,0,0,0,0,1,3,0,1,11,8,15
11174,0,0,0,0,0,0,0,0,0,0,0,0,0,0,0,0,0,0,0,0,0,0,0,0,0,0,0,0,3,7,4,8,8,3,0,6,0,0,0
10007,0,0,0,0,0,0,0,0,0,0,0,0,0,0,0,0,0,0,0,0,0,0,0,0,0,0,0,0,0,0,0,0,0,0,3,7,10,19

FIG. 3B

SAMPLE INTERIM MODEL A
400

```
38:22:d6:48:b0:50,2437, week1, week10,34
LEVEL4,19835, 29 ,2
19835,0,0,0,0,0,0,0,0,0,0,0,0,0,0,0,0,0,0,0,0,0,0,29,0,0,0,0,0,0,0,0
10009,0,0,0,0,0,0,0,0,0,0,0,0,0,0,0,0,0,0,0,2,14,10,3,0,0,0,0,0,0,0,0
```

*FIG. 4A*

SAMPLE INTERIM MODEL B
410

```
38:22:d6:48:b0:50,2437, week11, week12,34
LEVEL4,19835, 20 ,3
19835,0,0,0,0,0,0,0,0,0,0,0,0,0,0,0,0,0,0,0,0,0,0,2,18,0,0,0,0,0,0,0,0
10009,0,0,0,0,0,0,0,0,0,0,0,0,0,0,0,0,0,0,0,0,1,10,8,1,0,0,0,0,0,0,0,0
10008, 18 ,0,0,0,0,0,0,0,0,0,0,0,0,0,0,0,0,0,0,2,0,0,0,0,0,0,0,0,0,0,0
```

*FIG. 4B*

SAMPLE INTERIM MODEL A + B
420

```
38:22:d6:48:b0:50,2437, week1, week12,34
LEVEL4,19835, 49 ,3
19835,0,0,0,0,0,0,0,0,0,0,0,0,0,0,0,0,0,0,0,0,0,0,2,47,0,0,0,0,0,0,0,0
10009,0,0,0,0,0,0,0,0,0,0,0,0,0,0,0,0,0,0,0,3,24,18,4,0,0,0,0,0,0,0,0
10008,47,0,0,0,0,0,0,0,0,0,0,0,0,0,0,0,0,0,0,2,0,0,0,0,0,0,0,0,0,0,0
```

*FIG. 4C*

SAMPLE INTERIM MODEL C
430

38:22:d6:48:b0:50,2437, week1, week2,34
LEVEL4,19835,5,2
19835,0,0,0,0,0,0,0,0,0,0,0,0,0,0,0,0,0,0,0,0,0,0,5,0,0,0,0,0,0,0,0
10009,0,0,0,0,0,0,0,0,0,0,0,0,0,0,0,0,0,0,0,0,0,3,2,0,0,0,0,0,0,0,0,0

*FIG. 4D*

SAMPLE INTERIM MODEL D
440

38:22:d6:48:b0:50,2437, week3, week12,34
LEVEL4,19835, 44 ,3
19835,0,0,0,0,0,0,0,0,0,0,0,0,0,0,0,0,0,0,0,0,0,2,42,0,0,0,0,0,0,0,0
10009,0,0,0,0,0,0,0,0,0,0,0,0,0,0,0,0,0,0,0,3,21,16,4,0,0,0,0,0,0,0,0
10008,42,0,0,0,0,0,0,0,0,0,0,0,0,0,0,0,0,0,0,2,0,0,0,0,0,0,0,0,0,0,0

*FIG. 4E*

| Levels | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | ... |
|---|---|---|---|---|---|---|---|---|---|---|---|---|---|---|---|---|---|---|---|---|---|---|---|---|---|---|---|---|---|
| 19835 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 2/44 | 42/44 | 0 | 0 | ... |
| 10009 | 0 | 0 | 0 | 0 | 0 | 0 | 0 | 0 | 0 | 0 | 0 | 0 | 0 | 0 | 0 | 0 | 0 | 0 | 0 | 0 | 0 | 3/44 | 21/44 | 16/44 | 4/44 | 0 | 0 | 0 | ... |
| 10008 | 42/44 | 0 | 0 | 0 | 0 | 0 | 0 | 0 | 0 | 0 | 0 | 0 | 0 | 0 | 0 | 0 | 0 | 0 | 0 | 0 | 0 | 2/44 | 0 | 0 | 0 | 0 | 0 | 0 | ... |

SAMPLE PREDICTION MODEL 500

*FIG. 5*

ENABLE ACCESS POINT AVAILABILITY PREDICTION

CROSS-REFERENCE TO RELATED APPLICATIONS

This application is related to co-pending international applications PCT/CN2015/073871 filed on Mar. 9, 2015, entitled "Predicting Access Point Availability," PCT/CN2015/073874 filed on Mar. 9, 2015, entitled "Predicting Available Access Points," and filed on even date herewith, the disclosures of which are hereby incorporated by reference in their entireties.

BACKGROUND

Cellular network communications devices, such as cellular telephones and cellular network access points, transmit data across cellular networks. As bandwidth for transmitting data across cellular networks is often limited, some cellular network communications devices transfer data across other networks, such as broadband or satellite networks.

BRIEF DESCRIPTION OF THE DRAWINGS

Features of the present disclosure are illustrated by way of example and not limited in the following figure(s), in which like numerals indicate like elements, in which:

FIGS. 3A and 3B, respectively, show a table of a sample set of raw fingerprints and a table of a sample interim model for the sample set of raw fingerprints, according to examples of the present disclosure;

FIGS. 4A-4E, respectively, show sample interim models at various stages of incremental and/or decrementing training, according to examples of the present disclosure;

FIG. 5 shows a sample prediction model generated from the same interim model depicted in FIG. 4E, according to an example of the present disclosure;

DETAILED DESCRIPTION

Figure 1:
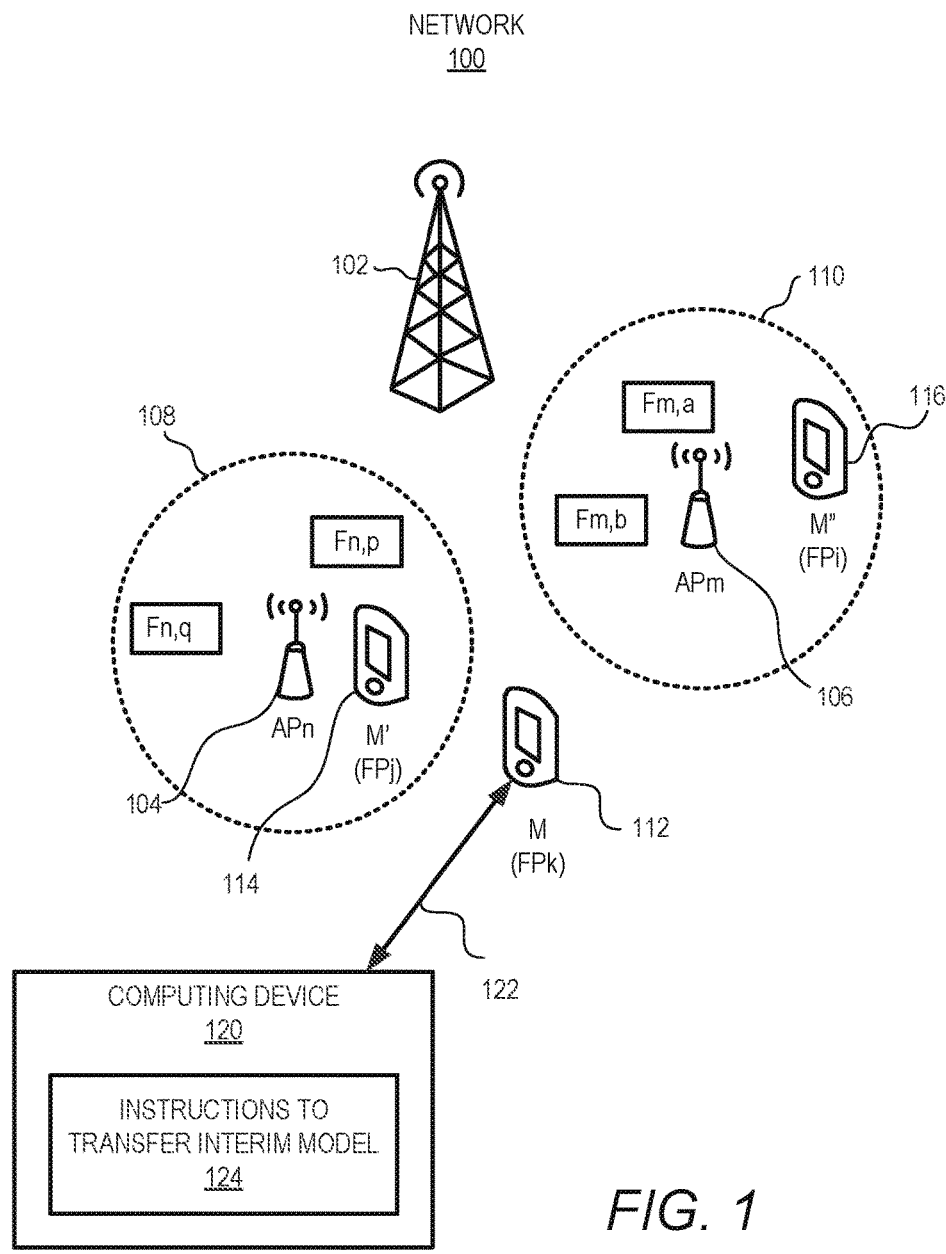
FIG. 1 shows a schematic diagram of a network on which various features of methods for enabling access point availability prediction disclosed herein may be implemented, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Cellular network communications devices, or cellular devices, may use mobile data offloading (MDO) techniques to avoid using cellular networks to transmit data. For example, a mobile device such as a cellular telephone, a tablet computer, a personal computer, etc., may connect to a broadband network using an included Wi-Fi radio in communication with a Wi-Fi access point, offloading the transmission of data from a cellular network to the broadband network. Offloading the transmission of data to a non-cellular network may increase available cellular network bandwidth and, in some situations, increase the speed and/or reliability of data transmission for individual communications devices. For users who have network provider enforced limits on cellular data transmission, data offloading may allow those users' devices to transmit data across networks that do not contribute to the users' cellular data limit.

For some MDO techniques, mobile devices use Wi-Fi radios to scan for and connect to available Wi-Fi access points that are connected to non-cellular networks. However, using a Wi-Fi radio requires power, and frequent use of a Wi-Fi radio to search for access points may drain a device's battery, and connecting or attempting to connect to an access point with relatively low signal strength may result in relatively slow data transmission and/or data loss, leading to a poor user experience. Predicting wireless access point availability allows a cellular network communications device to predict when a Wi-Fi access point may be within range of the device and, in some instances, predict the quality, e.g., signal strength, of the access point. This allows the mobile device to leave its Wi-Fi radio off until an access point with a certain predicted signal strength is predicted to be within range, preserving the device's battery and increasing the likelihood of performing a successful handoff. The mobile device may also leave its global positioning system (GPS) device turned off during identification of the predicted available access point.

As used herein, the term "access point" may refer to any device that allows wireless devices to connect to a network that is separate from the cellular network on which a cellular device is operating. For example, the access point may be a device connected to a Wi-Fi router or the Wi-Fi router itself, in which the Wi-Fi router is connected to a broadband or satellite network, or—in some implementations—a cellular hotspot connected to a cellular network that is separate from the cellular network on which the cellular device is operating. Cellular devices may communicate with access points in a variety of ways, including Wi-Fi, Wi-Fi Direct, and Bluetooth™, to name a few.

To predict wireless access point availability, a mobile device may gather fingerprints for successful handoffs, e.g., successful connections to Wi-Fi access points. Fingerprints may include data specifying cellular signal strengths, e.g., measured in decibel-milliwatts (dBm), for nearby cellular towers, or cells. For example, a mobile device may generate a fingerprint, also recited as a wireless fingerprint herein, at the time the mobile device connects to a Wi-Fi access point, and the fingerprint may specify the identifiers and cellular signal strengths of nearby cellular towers at the time of the connection. Each of the fingerprints may also specify an access point of a plurality of access points to which the mobile device made a successful connection and a relative signal strength of the connection to the access point.

As disclosed herein, a destination device may generate a prediction model without first performing a training procedure using a set of training fingerprints. Instead, the destination device may receive an interim model from a source device that the destination device may use to generate the prediction model. That is, the source device may gather a set of training fingerprints from a mobile device or mobile devices and may generate a prediction model for itself using the set of training fingerprints. Additionally, the source device may generate the interim model to contain mandatory information from the set of training fingerprints to enable the destination device to generate the prediction model. Moreover, the mandatory information may include only the information necessary for the destination device to generate the prediction model to have a level of accuracy that is similar or identical to the level of accuracy of the prediction model generated by the source device using the full set of training fingerprints.

The destination device may also combine the interim model with an existing interim model to generate a combined interim model. The combination may include incremental training of the existing interim model with the received interim model and/or decrementing training of the existing interim model with the received interim model. Existing interim models may therefore be updated without requiring that a full set of training fingerprints be updated. Additionally, the prediction model may be generated, for instance, by applying a relatively simple function to the interim model or the combined interim model. Moreover, the destination device may predict the availability of an access point by inputting, for instance, information pertaining to a cellular tower identifier and a cellular tower signal strength into the prediction model.

Through implementation of the methods and apparatuses disclosed herein, a prediction model may be generated in an efficient manner. Moreover, prediction of an available access point may be made without requiring that the Wi-Fi radio or the GPS device of a mobile device performing the prediction be activated, which may result in an optimization or minimization of the power consumed by the mobile device in attempting to connect to an available access point having a relatively high signal strength.

With reference to FIG. 1, there is shown a schematic diagram of a network 100 on which various features of methods for enabling access point availability prediction disclosed herein may be implemented, according to an example. It should be understood that the network 100 depicted in FIG. 1 may include additional components and that some of the components described herein may be removed and/or modified without departing from the scope of the network 100. For instance, the network 100 may include a plurality of cellular towers to which client devices may be in communication as well as a larger number of access points that is shown in FIG. 1.

As shown in FIG. 1, the network 100 may include a cellular tower 102, a first access point (APn) 104, and a second access point (APm) 106. The cellular tower 102 may provide cellular network coverage to cellular devices, such as mobile devices 112-116. Particularly, mobile devices 112-116 may communicate data over a cellular network through the cellular tower 102. The mobile devices 112-116 may also communicate data over a network other than the cellular network through the access points 104, 106. In this regard, the mobile devices 112-116 may be cellular telephones, tablet computers, personal computers, or the like, that are able to communicate data over both a cellular network and through an access point through, for instance, Wi-Fi, Bluetooth™, etc.

The first access point 104 may have a first Wi-Fi range 108 and the second access point 106 may have a second Wi-Fi range 110, as denoted by the dashed circles. For instance, the first access point (APn) 104 and the second access point (APm) 106 may provide the mobile devices 112-116 with access to the Internet through a network other than a cellular network, such as a broadband network, a satellite network, or the like, when the mobile devices 112-116 are within the respective Wi-Fi ranges of the first and second access points 104, 106. Although the first and second Wi-Fi ranges 108 and 110 have been depicted as being separated from each other, portions of the first and second Wi-Fi ranges 108, 110 may alternatively, overlap each other, for instance, depending upon the positions of the first access point 104 and the second access point 106 and their Wi-Fi ranges. Thus, for instance, a mobile device 112 may be within the Wi-Fi ranges 108, 110 of both of the access points 104, 106 when the mobile device 112 is positioned within an overlapping region of the first and second Wi-Fi ranges 108, 110.

According to an example, a mobile device 112 may be near the cellular tower 102, for instance, the mobile device 112 may be sufficiently close to the cellular tower 102 to communicate data to the cellular tower with a sufficient power to enable the cellular tower 102 to transmit its cellular tower identifier to the mobile device 112. As discussed above, in many instances, it may be beneficial for the mobile device 112 to communicate data over a network other than the cellular network provided by the cellular tower 102. Thus, for instance, it may be beneficial to identify an access point 104 that is available to the mobile device 112, such that the mobile device 112 may be off loaded to the access point 104 to avoid using the cellular network.

One manner of identifying an available access point 104 is to use a Wi-Fi radio of the mobile device 112 to scan for available access points. However, use of a Wi-Fi radio to perform this scanning requires power, and frequent use of a Wi-Fi radio to search for available access points may drain a battery of the mobile device 112. Additionally, even when an available access point is identified, there is no guarantee that the signal strength of the identified available access point will provide a sufficient level of data transmission. As such, the mobile device 112 may consume a relatively large amount of energy in identifying available access points and in attempting to or connecting to access points having relatively low signal strengths.

According to an example, an access point 104 available to the mobile device 112 having a relatively high signal strength may be predicted through use of a set of training fingerprints and prediction modeling on the set of training fingerprints. The training fingerprints may be gathered by the mobile devices 112-116 and/or other mobile devices, and may be communicated to a computing device 120, as denoted by the arrow 122. The computing device 120 may be, for example, a cellular telephone, a smartphone, a personal computer, a server computer, or any other similar electronic device that is able to perform cellular communications or communicate with mobile devices. In an example, the computing device 120 is a mobile device similar to the mobile devices 112-116. In this example, the computing device 120 may additionally or alternatively gather the training fingerprints.

The training fingerprints may be gathered at various locations with respect to the cellular tower 102 and the access points 104, 106. As shown in FIG. 1, a number of historic fingerprints $F_{n,p}$, $F_{n,q}$, $F_{m,a}$ and $F_{m,b}$ and provided at various locations, in which each of the historic fingerprints represents a location at which fingerprints were previously collected by mobile devices, which may be the mobile devices 112-116 and/or other mobile devices. Each of the training fingerprints may specify an access point of a plurality of access points to which a mobile device 112-116 made a successful connection and a cellular signal strength of a cellular tower 102 near the mobile device 112-116 when the successful connection was made. Thus, for instance, each of the training fingerprints may specify a basic service set identification (BSSID) of the access point to which the successful connection was made, a cellular tower identifier of a nearby cellular tower and the cellular signal strength of communications from the nearby cellular tower. Each of the training fingerprints may also specify a relative signal strength of the connection to the access point 104, 106.

The computing device 120 may generate a prediction model from the set of training fingerprints. That is, the computing device 120 may generate a prediction model that predicts the availability of an access point 104, 106 for a mobile device 112-116 based upon certain input information. For instance, the prediction model may predict the availability of an access point 104, 106 corresponding to a cellular signal strength of a cellular tower 102. In other words, the computing device 120 may generate a prediction model that takes as input the cellular signal strength of a cellular tower that is near a mobile device 112 and may output an access point 104 that is predicted to be available to the mobile device 112.

As also shown in FIG. 1, the first mobile device M 112 may have a current cellular fingerprint $FP_k$, the second mobile device M' 114 may have a cellular fingerprint $FP_j$, and the third mobile device M" 116 may have a cellular fingerprint $FP_i$. According to an example, the second mobile device M' 114 may attempt to identify an access point 104 that is predicted to be available to the second mobile device M' 114. In this example, the second mobile device M' 114 may communicate the current cellular fingerprint $FP_j$ of the second mobile device M' 114 to the computing device 120. The current cellular fingerprint $FP_j$ of the second mobile device M' 114 may include fingerprint information of the cellular tower 102. For instance, the current cellular fingerprint $FP_j$ may specify a cellular tower identifier and a cellular signal strength of the cellular tower 102. Although the cellular tower identifier may remain constant, the cellular signal strength of the cellular tower 102 may vary depending upon the location of the second mobile device M' 114 with respect to the cellular tower 102.

The computing device 120 may input the received current cellular fingerprint $FP_j$ into the prediction model to identify the access point 104 as being predicted to be available to the second mobile device 114. The computing device 120 may also inform the second mobile device 114 that the access point 104 is predicted to be available. The second mobile device 114 may also attempt to connect to the access point 104. In this regard, the second mobile device 114 may identify the access point 104 through a prediction of availability of the access point 104 instead of through use of a Wi-Fi radio to scan for the access point 104.

In another example, the computing device 120 is the second mobile device 114. In this example, identification of the current cellular fingerprint $FP_j$ and the prediction of the available access point 104 may be performed by the computing device 120. That is, the computing device 120 may communicate with the cellular tower 102 to obtain the cellular tower identifier and determine the cellular signal strength of the cellular tower. The computing device 120 may also apply the prediction model to predict the available access point 104.

The computing device 120 may generate any reasonably suitable prediction model from the set of training fingerprints. Various examples of suitable prediction models are described in co-pending international applications PCT/CN2015/073871, PCT/CN2015/073874, and the disclosures of which are hereby incorporated by reference in their entireties.

According to an example, the computing device 120 may provide a destination device, such as the first mobile device 112, with the ability to predict an available access point 104 without having to gather the training fingerprints or generate the prediction model from the set of training fingerprints. As described in greater detail below, the computing device 120 may include instructions 124 to generate an interim model and to transfer the interim model to the first mobile device 112 as indicated by the arrow 122. In this regard, and as described in greater detail herein below, the first mobile device 112 may implement a prediction model to predict the availability of an access point 104 without performing the training procedure performed by the computing device 120 to generate the prediction model.

Figure 2:
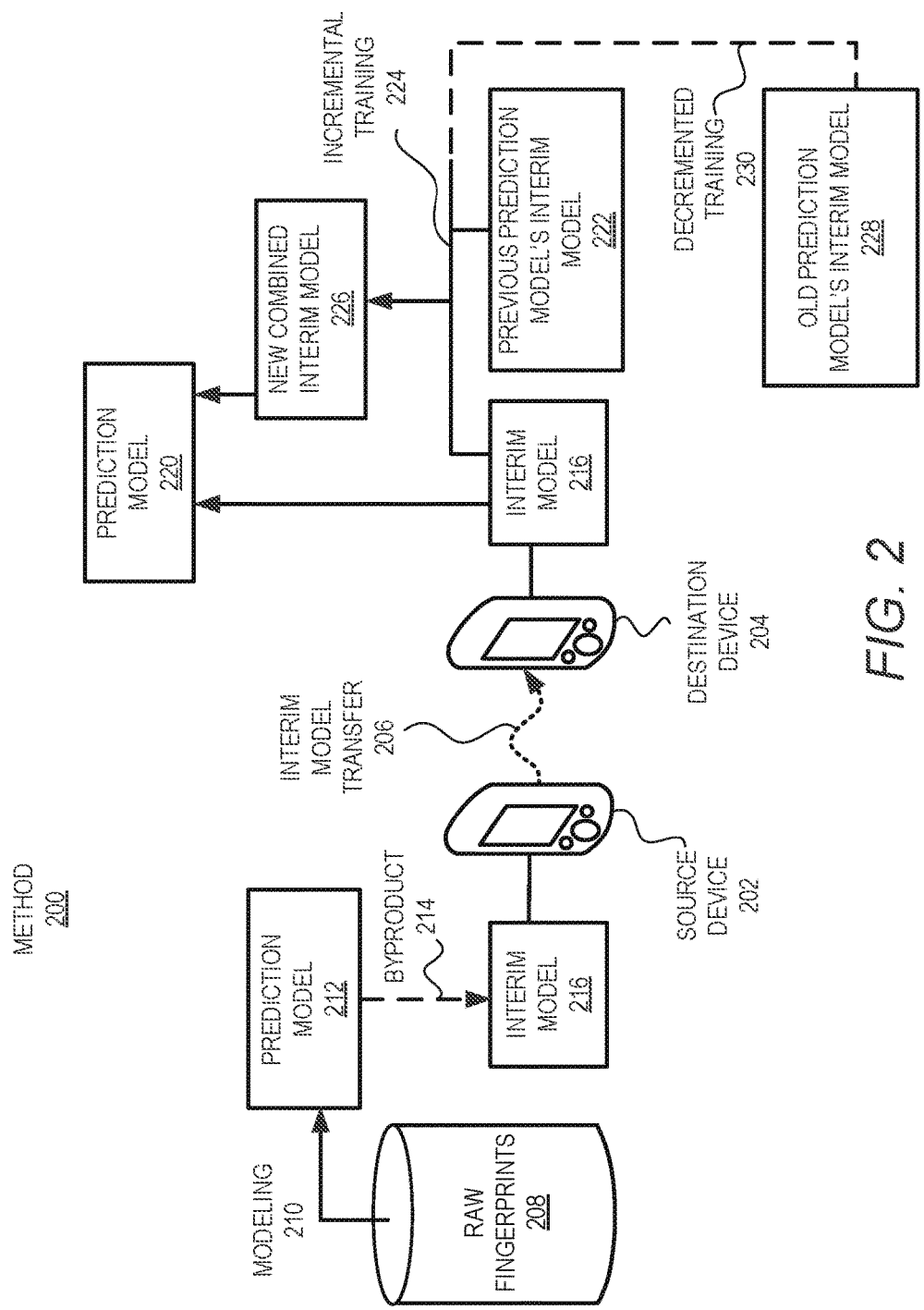
FIG. 2 shows a simplified process flow diagram of a method for enabling access point availability prediction in a destination device, according to an example of the present disclosure.

Turning now to FIG. 2, there is shown a simplified process flow diagram of a method 200 for enabling access point availability prediction in a destination device, according to an example. It should be understood that the method 200 depicted in FIG. 2 may include additional features and that some of the features described herein may be removed and/or modified without departing from the scope of the method 200.

In the method 200, a source device 202 may transfer an interim model to a destination device 204, as indicated by the arrow 206. According to an example, the source device 202 may be the computing device 120 and the destination device 204 may be the mobile device 112 depicted in FIG. 1. In another example, the source device 202 may be a first mobile device 112 and the destination device 204 may be a second mobile device 114.

As shown in FIG. 2, the source device 202 may access a set of raw fingerprints 208, in which each of the raw fingerprints 208 may specify an access point of a plurality of access points to which a mobile device made a successful connection and a cellular signal strength of a cellular tower near the client device when the successful connection was made. That is, for instance, the source device 202 may gather or otherwise access the set of training fingerprints from a mobile device 112 or from multiple mobile devices 112-116. In addition, the source device 202 may perform a modeling operation 210 on the raw fingerprints 208 to generate a prediction model 212. The source device 202 may generate the prediction model in any of the manners described in the co-pending international applications identified above.

Additionally, the source device 202 may generate an interim model 216 from the raw fingerprints 208 or as a byproduct 214 of the prediction model 212. The interim model 216 may contain information to enable the destination device 204 to predict an availability of an access point 104. For instance, the interim model 216 may contain fingerprint information to enable the destination device 204 to predict an access point availability, in which the fingerprint information may specify an access point of a plurality of access are points to which a mobile device made a successful connection and a cellular signal strength of a cellular tower near the mobile device when the successful connection was made. By way of example, the interim model 216 may contain a subset of information from the set of training fingerprints, in which the subset of information includes information that the destination device 202 may need to accurately predict the availability of an access point.

The source device 202 may thus be provided with an indication of the type of prediction model the destination device 204 is to implement and may generate the interim model 216 based upon the indication of the type of prediction model to be implemented. In an example in which the destination device 204 is to implement a prediction model that generates an access point profile for each access point from the training fingerprints as described in PCT/CN2015/073871, the subset of information may require the following information. Each access point coverage to be divided into relative signal strength levels and each relative signal strength level further to be subdivided into sub-regions and registered cellular tower identifiers of a cellular fingerprint. In this example, the source device 202 may generate the interim model 216 to have the features as shown in Table 1 below.

TABLE 1

| | |
|---|---|
| 1 BSSID, Channel, StartTime, EndTime, CellRSSLevels | →Appear only once for a specific AP |
| 2 LEVEL, RegCellID, FPsCount, CellIDsCount | →Appear as many times as the count of the sub-regions |
| 3 CellID, CellRSSLevelCounts | →Appear as many times as CellIDsCount of a given sub-region |

The terms listed in Table 1 may be defined as follows:
BSSID: basic service set identification (BSSID) of an access point (AP);
Channel: channel information of an AP;
StartTime: the starting time of the represented raw fingerprints;
EndTime: the ending time of the represented raw fingerprints;
CellRSSLevels: the cellular received signal strength indication (RSSI) levels used in the prediction model that the destination device is to implement;
LEVEL: one AP level;
RegCellID: registered cellular tower identifier (Cell-ID) of the sub-region;
FPsCount: count of the fingerprints contained in the sub-region for modeling in prediction model to be implemented by the destination device;
CellDsCount: all of the Cell-IDs appearing in the sub-region of raw fingerprints for modeling;
CellID: a specific Cell-ID in the given sub-region; and
CellRSSLevelCounts: an array of cellular tower relative signal strength level (CellRSSLevel) elements, in which each element is a count of the corresponding Cell RSS level.

For purposes of illustration, reference is made to FIGS. 3A and 3B, which show a table 300 of a sample set of raw fingerprints 208 and a table 310 of a sample interim model 216 for the set of raw fingerprints 208, respectively. Particularly, FIG. 3A depicts a sample set of raw fingerprints 208 for an access point 38:22:d6:48:b0:50, in which there are 1115 records of raw fingerprints. The table 300 depicts each of the fingerprints (FPs) as specifying various information, including, a time (TIME), a registered Cell-ID of a sub-region (RegCell-ID), the relative signal strength of a cellular tower (RSS), all of the cellular tower identifier and cellular signal strength pairs (All<Cell-ID,RSS>), the service set identifier of the access point (AP-SSID), the basic service set identifier of the access point (AP-BSSID), the channel of the access point (AP-Channel), and a relative signal strength of the AP (AP-RSS).

In this example, an interim model 216 for access point 38:22:d6:48:b0:50 may be generated as shown in the table 310 in FIG. 3B. For simplicity, only two sub-regions are shown in the table 310. As shown in the table 310, the interim model 216 may have a much smaller number of records as compared with the raw fingerprints 208. For instance, the sub-region 19835 compacts 29 records of raw fingerprints into 8 lines of Cell-ID distribution arrays and the sub-region 10008 compacts 39 records of raw fingerprints into 9 lines of Cell-ID distribution arrays. In this regard, the interim model 216 may have a much smaller size as compared with the raw fingerprints 208.

With reference back to FIG. 2 and according to an example, the source device 202 may transform the interim model 216 between different formats, for instance, objects, strings, files, etc., prior to transferring the interim model 216 to the destination device 204. In this regard, the source device 202 may transform the interim model 216 into a format that is compatible or otherwise accessible by the destination device 204.

The source device 202 may transfer the interim model 216 to the destination device 204 through any suitable connection, such as over a cellular network, e.g., as a text message, as an email message, etc. In another example, the source device 202 may transfer the interim model 216 over a peer-to-peer connection, such as through a Bluetooth™ connection. In any regard, the source device 202 may transfer the interim model 216 in response to receipt of a request for the interim model 216 from the destination device 204. Additionally, the source device 202 may compress the interim model 216 according to any suitable compression technique prior to transferring the interim model 216 to reduce or minimize the size of the interim model 216.

Following receipt of the compressed interim model 216, the destination device 204 may decompress the interim model 216 and may store the decompressed interim model 216 in a data store. The interim model 216 may also be loaded into interim model objects in the destination device 204. The destination device 204 may further generate a prediction model 220 from the interim model 216, for instance, by restoring the interim model 216. For instance, the destination device 204 may restore the interim model 216 as the prediction model 220 by dividing each distribution array element in the interim model 216 with a total fingerprint count of a corresponding PMF. In one regard, therefore, the destination device 204 may generate the prediction model 220 without performing a training procedure. As such, through use of the interim model 216, the destination device 204 may generate the prediction model 220 in a relatively short period of time and without requiring as much processing as is required when a training procedure is performed. Thus, for instance, the methods disclosed herein may improve the efficiency at which a computing device is able to generate a prediction model 220 and predict an availability of an access point.

In addition, the destination device may implement the prediction model 220 to predict an available access point. For instance, the destination device 204 may determine the cellular tower identifier and cellular signal strength of a cellular tower that is near the destination device 204 and may input that information into the prediction model 220.

The prediction model 220 may determine from that information an access point that is predicted to be available to the destination device 204 and the destination device 204 may attempt to connect to the predicted access point.

In some instances, a previously received interim model 222 may be stored in the destination device 204. The previously received interim model 222 may be an interim model that a source device 202 generated based upon a previous prediction model. In these instances, the destination device 204 may combine the interim model 216 with the previously received interim model 222 by performing incremental training 224 on the interim model 216. In this regard, the incremental training may be performed on the interim model 216 itself instead of on the raw fingerprints 208. According to an example, the incremental training may involve adding corresponding distribution array elements in the interim model 216 with the previously received interim model 222 to generate a new combined interim model 226.

By way of example in which the interim model 216 corresponds to the prediction model described in PCT/CN2015/073871, each sub-region identified in the interim model 216 may be stored with the exact occurrence of the Cell RSS levels in all of the raw fingerprints 208, and the interim model 216 may also reflect the same probability mass function distribution characteristics. In this example, the interim models 216 and 222 may be combined through implementation of the following process:

model 212 may be stored in the interim probability mass function (PMF) data. In addition, when applied with the previous prediction model's interim model 222 on the destination device 204, the new prediction model may be the result of taking all of the available fingerprint data 208 into account. In one regard, therefore, the prediction result obtained through performing incremental training 224 on the interim model 216 may be as accurate as a prediction result obtained from the raw fingerprints 208.

In other instances, an old prediction model's interim model 228 may be stored in the destination device 204. The old prediction model's interim model 228 may be an interim model that was generated from old, out-of-date information. The use of this interim model 228 may thus have a negative effect on the prediction results. Accordingly, the destination device 204 may perform decremented training 230 on the old prediction model's interim model 228. In this regard, the decremented training may be performed using the interim model 216 itself instead of, for instance, generating new prediction models from an updated set of raw fingerprints 208. According to an example, the decrementing training may involve subtracting corresponding distribution array elements in the interim model 216 from the old prediction model's interim model 228 to generate a new combined interim model 226.

By way of example in which the interim model 216 corresponds to the prediction model described in PCT/

```
Input: destination interim model M_d and source interim model M_s
1.   Combine the duration timestamps of M_d and M_s;
2.   Loop through all AP levels L^s in M_s;
3.       If interim level distribution L_i^d not found in M_d, then:
4.           Copy L_i^s to M_d;
5.       Else
6.           Loop through all PMFs E in L_i^s :
7.               If interim PMF E_j^d not found in level L_i^d , then:
8.                   Copy E_j^s to L_i^d ;
9.               Else
10.                  Define C^s as the Cell-IDs set of E_j^s , C^d as
                     that of E_j^d , and C^ALL = C^s ∪ C^d;
11.                  Define F^s as the fingerprints count of E_j^s , F^d
                     as that of E_j^d , and F^ALL = F^s + F^d;
12.                  Loop through C^ALL:
13.                      If current C_k^ALL only found in E_j^d ,
                         then:
14.                          Add Cell-ID interim distribution
                             level 1 count (i.e., unknown
                             count) with F^s;
15.                      Else-If current C_k^ALL only found in
                         E_j^s, then:
16.                          Copy the entire Cell-ID interim
                             distribution array to E_j^d ;
17.                          Add Cell-ID interim distribution
                             level 1 count (i.e., unknown
                             count) with F^d;
18.                      Else
19.                          Add the Cell-ID interim
                             distribution array from E_j^s to
                             E_j^d element by element;
20.                      End-If
21.                  End-Loop
22.              End-If
23.          End-Loop
24.      End-If
25.  End-Loop
26.  Define the new interim model as M^n;
27.  Divide every Cell-ID interim distribution array element by corresponding
     F^ALL of E^n , and get the new prediction model P^n;
Output: the new prediction model P^n and the new interim model M^n
```

It may be seen from the process above that accuracy of the source prediction model may be maintained because all of the Cell RSS distribution information for the prediction CN2015/073871, a decrementing training using the interim model 216 on the old prediction model's interim model 228 may be performed through implementation of the following process:

```
Input: destination interim model M_d and source interim model M_s
 1.     Subtract the duration timestamps of M_s from M_d;
 2.     Loop through all AP levels L^s in M_s:
 3.         If interim level distribution L^d_i found in M_d, then:
 4.             Loop through all PMFs E in L^s_i :
 5.                 If interim PMF E_j^d found in level L_i^d , then:
 6.                     Define C^s as the Cell-IDs set of E_j^s , C^d as
                        that of E_j^d , and C^{ALL}= C^s ∪ C^d;
 7.                     Define F^s as the fingerprints count of E_j^s , F^d
                        as that of E_j^d , and F^{SUB} = F^d −F^s;
 8.                     Loop through C^{ALL};
 9.                         If current C_k^{ALL} only found in E_j^d ,
                            then:
10.                             Subtract Cell-ID interim
                                distribution level 1 count with
                                F^s;
11.                         Else-If current C_k^{ALL} both found in E_j^s
                            and E_j^d , then:
12.                             Subtract the Cell-ID interim
                                distribution array of E_j^s from
                                E_j^d element by element;
13.                             Remove all the empty Cell-ID
                                interim distribution arrays from
                                E_j^d ;
14.                         End-If
15.                     End-Loop
16.                 End-If
17.             End-Loop
18.         End-If
19.     End-Loop
20.     Define the new interim model as M^n;
21.     Divide every Cell-ID interim distribution array element by corresponding
        F^{SUB} of E^n , and get the new predicition model P^n;
Output: new prediction model P^n and the new interim model M^n
```

Additionally, the destination device 204 may generate the prediction model 220 from the new combined interim model 226, which has been incremented and/or decremented. According to an example, the prediction model 220 may be generated by dividing each distribution array element in the new combined interim model 226 with a total fingerprint count of a corresponding PMF. The destination device 204 may also implement the prediction 220 as described herein to predict the availability of an access point.

For purposes of illustration, reference is made to FIGS. 4A-4E, which respectively show sample interim models 400-440 at various stages of incremental and/or decrementing training. The information contained in each of the sample interim models 400-440 may be arranged in the same manner as described above with respect to the 310 depicted in FIG. 3B.

FIG. 4A depicts a sample interim model A 400 and FIG. 4B depicts a sample interim model B 410. FIG. 4C depicts a sample interim model 420, which may result following an incremental training of the sample interim model A 400 and the sample interim model B 410. As shown in FIG. 4C, for instance, the identifier of the access point is 38:33:d6:48:b0:50, the RSS level is 4, the values identified for the sub-regions 19835 and 10009 are added together, and the values for the sub-region 10008 has been added.

FIG. 4D depicts a sample interim model C 430. FIG. 4E depicts a sample interim model D 440, which may result following a decrementing training of the sample interim model A+B 420 and sample interim model C 430. As shown in FIG. 4E, some of the values in the sample interim model A+B 420 have been decreased by the corresponding values in the sample interim model C 430.

A prediction model 500 may be generated from based on the sample interim model D 440, for instance, by dividing each distribution array element with a total fingerprint count of a corresponding PMF, as shown in FIG. 5. In the example shown in FIG. 5, the total fingerprint count is 44.

Figure 6:
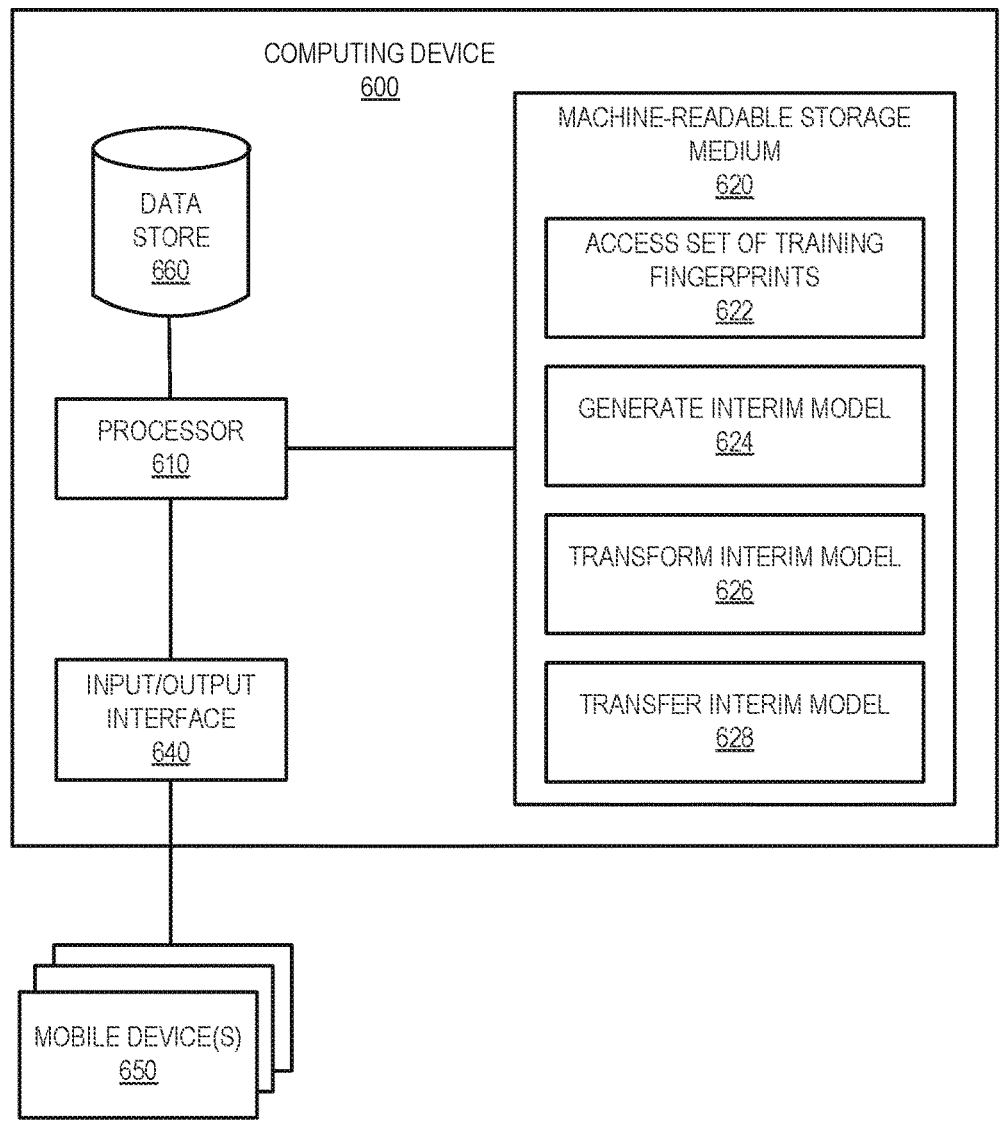
FIG. 6 shows a block diagram of a computing device to enable access point availability prediction, according to an example of the present disclosure.

With reference now to FIG. 6, there is shown a block diagram of a computing device 600 to enable access point availability prediction, according to an example. It should be understood that the computing device 600 depicted in FIG. 6 may include additional components and that some of the components described herein may be removed and/or modified without departing from a scope of the computing device 600.

The computing device 600 may be, for example, a cellular telephone, a smartphone, a personal computer, a server computer, or any other similar electronic device that is able to perform cellular communications or communicate with mobile devices. The computing device 600 may be equivalent to the computing device 120 depicted in FIG. 1 and may thus be a source device as discussed above. The computing device 600 is depicted as including a processor 610 and a machine-readable storage medium 620. The processor 610 may be one or more central processing units (CPUs), semiconductor-based microprocessors, an application specific integrated circuit (ASIC), and/or other hardware devices suitable for retrieval and execution of instructions stored in the machine-readable storage medium 620. The processor 610 may fetch, decode, and execute instructions, such as instructions 622-628 stored on the machine-readable storage medium 620, to control processes to access a set of training fingerprints 622, generate an interim model 624, transform an interim model 626, and transfer the interim model 628. As an alternative or in addition to retrieving and executing instructions, the processor 610 may include one or more electronic circuits that include electronic components for performing the functionalities of the instructions 622-628. These processes are described in detail below with respect to FIG. 7.

The machine-readable storage medium 620 may be any electronic, magnetic, optical, or other physical storage device that contains or stores executable instructions. Thus, the machine-readable storage medium 620 may be, for example, Random Access Memory (RAM), an Electrically Erasable Programmable Read-Only Memory (EEPROM), a storage device, an optical disc, and the like. In some implementations, the machine-readable storage medium 620 may be a non-transitory storage medium, where the term "non-transitory" does not encompass transitory propagating signals. As described in detail below, machine-readable storage medium 620 may be encoded with a series of executable instructions 622-628 to generate and transfer an interim model to a destination device.

As also shown in FIG. 6, the computing device 600 may also include an input/output interface 640 through which the processor 610 may communicate with mobile device(s) 650. The input/output interface 640 may include hardware and/or software to enable the processor 610 to communicate with the mobile device(s) 650. The input/output interface 640 may enable a wireless connection to the mobile device(s) 650, for instance, through a peer-to-peer connection such as Bluetooth™ etc. The input/output interface 640 may also enable a wired connection to the mobile device(s) 650 directly and/or through a network. The input/output interface 640 may further include a network interface card and/or may also include hardware and/or software to enable the processor 610 to communicate with various input and/or output devices, such as a keyboard, a mouse, a display, another computing device, etc., through which a user may input instructions into the computing device 600.

Each of the mobile devices 650 may be similar to the mobile devices 212-216 described herein above. As also described above, the mobile device(s) 650 may collect training fingerprints for each successful connection to a wireless access point. Each of the training fingerprints may specify an access point to which the mobile device 650 successfully connected and a cellular signal strength for each cellular tower in a set of cellular towers that are near the mobile device 650 when the successful connection to the access point was made. For example, a mobile device 650, such as a cellular telephone may, in response to successfully connecting to an access point, create and provide to the computing device 600 training fingerprints that include signal strength measurements for each of the cellular towers within range of the cellular telephone at the time the cellular telephone connected to the access point. That is, for instance, each training fingerprint may specify a cellular tower or towers that were near the mobile device 650 when the mobile device 650 successfully connected to the access point. In a particular example, a training fingerprint may specify a cellular tower or towers to which the mobile device 650 was in communication with prior to or during the successful connection to the access point.

In some examples, each training fingerprint further specifies, for the corresponding mobile device 650, an access point signal strength for the access point to which the mobile device 650 successfully connected. For example, in addition to specifying the signal strengths of each nearby cellular tower, a fingerprint may also specify the relative signal strength of the access point to which the cellular telephone connected.

Figure 7:
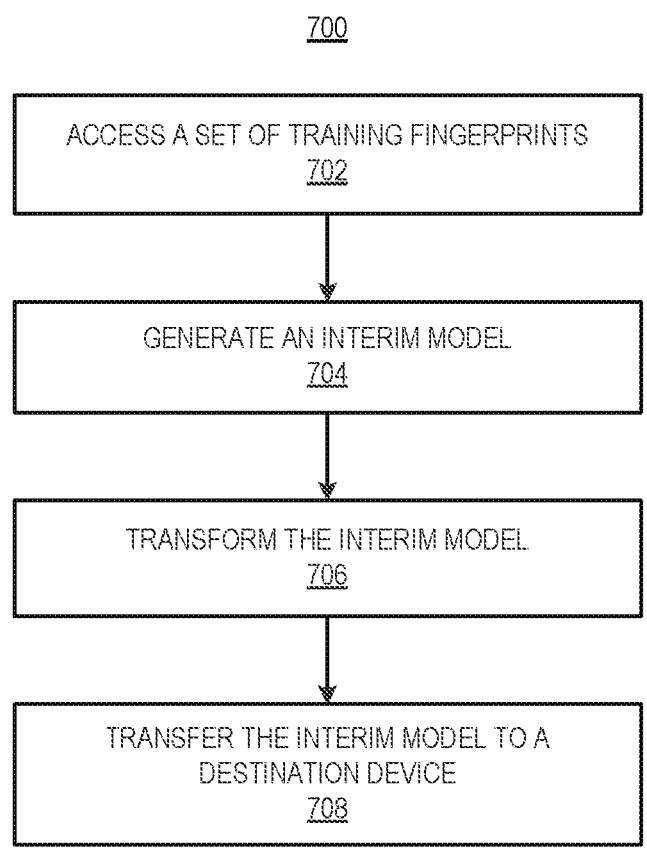
FIG. 7 shows a flow diagram of a method for enabling access point availability prediction in a destination device, according to an example of the present disclosure.

With reference now to FIG. 7, there is shown a flow diagram of a method 700 for enabling access point availability prediction in a destination device, according to an example. It should be understood that the method 700 depicted in FIG. 7 may include additional operations and that some of the operations described herein may be removed and/or modified without departing from the scope of the method 700. The description of the method 700 is made with reference to the features depicted in FIG. 6 for purposes of illustration and thus, it should be understood that the method 700 may be implemented in apparatuses having architectures different from those shown in that figure.

In one example, a processor 610 of a computing device 600 that is to receive collected training fingerprints from a mobile device 650 or mobile devices 650 may implement the method 700. In another example, a processor 610 of a computing device 600, in which the computing device 600 is a mobile device 650, may implement the method 700. In this example, the computing device 600 may collect the training fingerprints.

At block 702, the processor 610 may access a set of training fingerprints. The training fingerprints may have previously been collected and stored in a data store 660 and the processor 610 may access the set of training fingerprints from the data store 660. Each of the training fingerprints may specify an access point of a plurality of access points to which a mobile device 650 successfully connected over a period of time, for instance, over a day, a week, etc. Each of the training fingerprints may also specify a relative signal strength of the connection to the access point, and a cellular signal strength, e.g., received signal strength indicator (RSSI), of a cellular tower to which the client device 650 was connected prior to the mobile device 650 being handed off from the cellular tower to the access point. In other words, each of the training fingerprints may specify a cellular signal strength of a connection between the mobile device 650 and the cellular tower immediately prior to or during establishment of the connection between the mobile device 650 and the access point being established.

At block 704, the processor 610 may generate an interim model containing a subset of the information in the accessed set of training fingerprints, in which the subset of the information is to enable a destination device to predict, based upon the information contained in the interim model, an availability of an access point. That is, for instance, the processor 610 may generate the interim model to include only the necessary or mandatory information that a destination device will need to generate a prediction model without having to perform a training procedure. In addition, the processor 610 may generate the interim model to include information necessary for the destination device to generate a prediction model that has an accuracy that is similar or equivalent to an accuracy of a prediction model generated through use of the set of training fingerprints. The interim model may, therefore, include different types of information depending upon the type of prediction model that the destination device is to generate. Moreover, the interim model may include a significantly smaller amount of information than the Information contained in the set of training fingerprints.

At block 706, the processor 610 may transform the generated interim model. For instance, the processor 610 may transform the generated interim model from a first format (e.g., objects) that is compatible with the computing device 600 to a second format (e.g., strings) that is compatible with the destination device. However, block 706 may be optional in instances in which the computing device 680 destination device share compatible formats.

At block 708, the processor 610 may transfer the interim model to the destination device. The processor 610 may transfer the interim model to the destination device through any suitable connection, such as over a cellular network, e.g., as a text message, as an email message, etc. In another example, the processor 610 may transfer the interim model over a peer-to-peer connection, such as through a Bluetooth™ connection.

Figure 8:
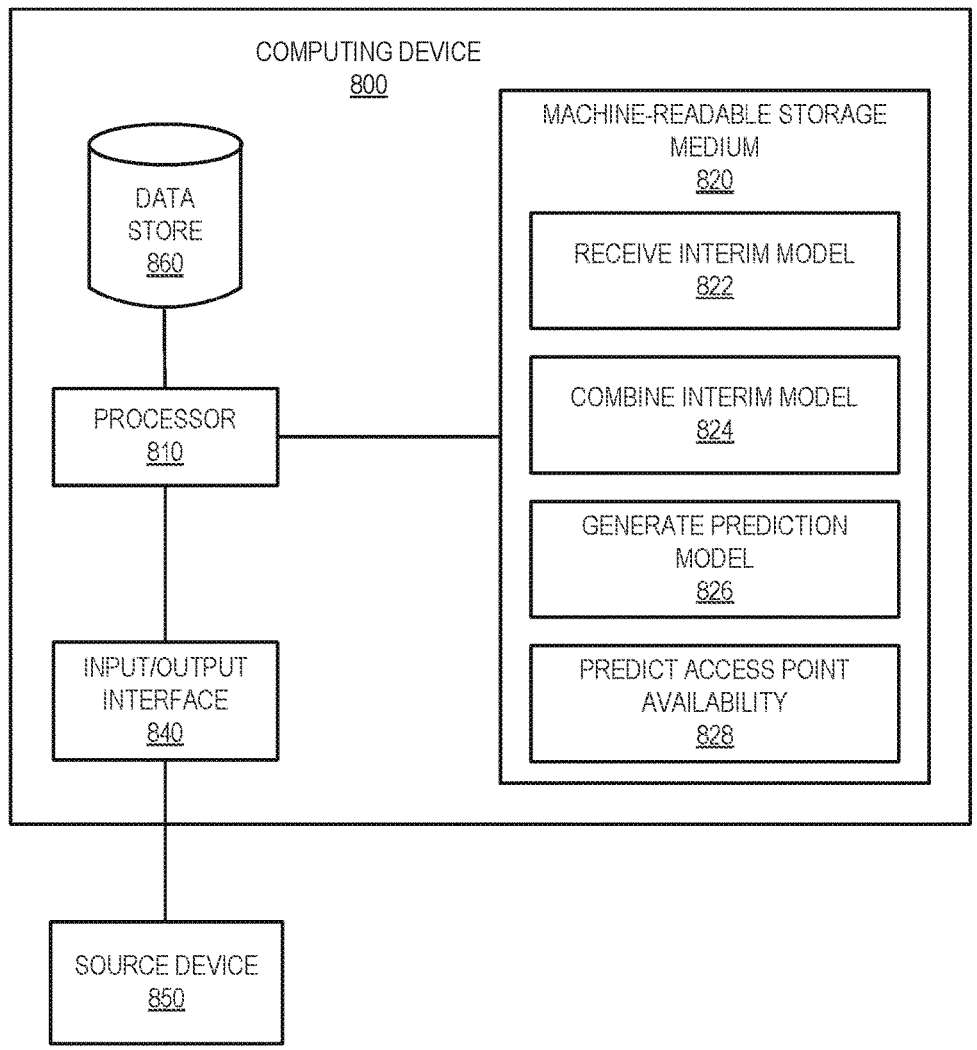
FIG. 8 shows a block diagram of a computing device to predict access point availability, according to an example of the present disclosure.

With reference now to FIG. 8, there is shown a block diagram of a computing device 800 to predict access point availability, according to an example. It should be understood that the computing device 800 depicted in FIG. 8 may include additional components and that some of the components described herein may be removed and/or modified without departing from a scope of the computing device 800.

The computing device 800 may be, for example, a cellular telephone, a smartphone, a personal computer, a server computer, or any other similar electronic device that is able to perform cellular communications or communicate with mobile devices. The computing device 800 may be equivalent to a mobile device 212 depicted in FIG. 1 and may thus be a destination device as discussed above. The computing device 800 is depicted as including a processor 810 and a machine-readable storage medium 820. The processor 810 and the machine-readable storage medium 820 may be similar to the processor 610 and machine-readable storage medium 620 described above with respect to FIG. 6. The processor 810, however, may fetch, decode, and execute instructions, such as instructions 822-828 stored on the machine-readable storage medium 820, to control processes to receive an interim model 822, combine the received interim model with an existing interim model 824, generate a prediction model 826, and predict an access point availability 828. These processes are described in detail below with respect to FIG. 9.

As also shown in FIG. 8, the computing device 800 may also include an input/output interface 840 through which the processor 810 may communicate with a source device 850, for instance, to receive the interim model. The input/output interface 840 may be similar to the input/output interface 640 depicted in FIG. 6. Additionally, the source device 850 may be similar to the computing device 600 described herein above.

Figure 9:
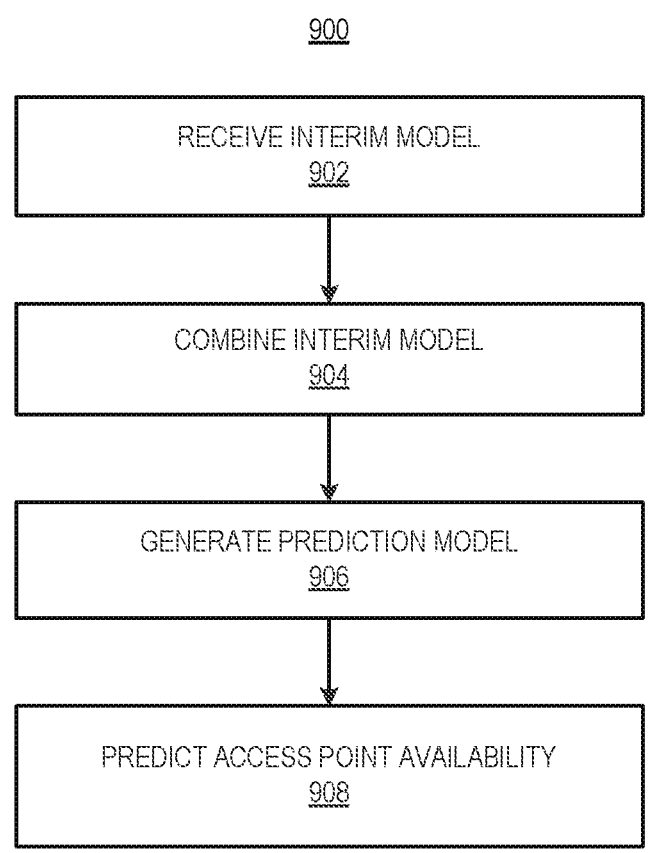
FIG. 9 shows a flow diagram of a method for predicting access point availability, according to an example of the present disclosure.

With reference now to FIG. 9, there is shown a flow diagram of a method 900 for predicting access point availability, according to an example. It should be understood that the method 900 depicted in FIG. 9 may include additional operations and that some of the operations described herein may be removed and/or modified without departing from the scope of the method 900. The description of the method 900 is made with reference to the features depicted in FIG. 8 for purposes of illustration and thus, it should be understood that the method 800 may be implemented in apparatuses having architectures different from those shown in that figure.

At block 902, the processor 810 may receive an interim model from a source device 850, in which the interim model contains a subset of fingerprint information contained on the source device 850. The subset of the fingerprint information may be the information required for the computing device 800 to generate a prediction model having an accuracy level similar to an accuracy level of a source prediction model generated at the source device 850 using the fingerprint information. Various examples of the interim model are provided above, for instance, with respect to FIGS. 3A and 3B.

At block 904, the processor 810 may combine the interim model with an existing interim model. For instance, as described above with respect to FIGS. 4A-4E, the processor 810 may perform incremental and/or decrementing training using the received interim model and an existing interim model or existing interim models. Block 904 may be optional in instances in which the computing device 800 does not have an existing interim model.

At block 906, the processor 810 may generate a prediction model from the received interim model or a combined interim model. The processor 810 may generate the prediction model in any of the manners described above. For instance, the processor 810 may generate the prediction model by dividing each distribution array element in the interim model or the combined interim model with a total fingerprint count of a corresponding PMF. In this regard, the processor 810 may generate the prediction model without performing a training procedure.

At block 908, the processor 810 may predict an access point availability using the generated prediction model. For instance, the prediction model may identify, for cellular tower identifier and cellular signal strength pairs, corresponding access points having the highest signal strengths. In this example, the processor 810 may identify a cellular tower identifier and a cellular tower signal strength from a cellular tower that is near the computing device 800. The processor 810 may also input the identified cellular tower identifier and cellular tower signal strength into the prediction model, in which the prediction model is to output the predicted access point availability corresponding to the identified cellular tower identifier and cellular tower signal strength. For instance, the prediction model may output the access point determined to have the strongest signal strength for the inputted cellular tower identifier and cellular tower signal strength.

Through implementation of the features disclosed herein, a destination device may generate a prediction model without performing a lengthy training procedure. Instead, the destination device may generate the prediction model from an interim model that contains the mandatory information required for the destination device to generate the prediction model without performing the training procedure. In some instances, the interim model may only contain the mandatory information that enables the destination device to generate the prediction model with a level of accuracy that matches or is near the accuracy level of a prediction model that is generated with a full set of training fingerprints. In this regard, the features disclosed herein may enable a computing device to predict availability of an access point in an efficient manner both in terms of time and energy consumed. That is, the computing device may generate the prediction model in a relatively short period of time while utilizing a minimal amount of resources and may predict the availability of an access point with its Wi-Fi radio and GPS device turned off.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A computing device comprising:
   a processor; and
   a memory on which is stored machine readable instructions that are to cause the processor to:
   access a set of training fingerprints, wherein each of the training fingerprints specifies an access point of a plurality of access points to which a mobile device made a successful connection and a cellular signal strength of a cellular tower near the client device when the successful connection was made;
   generate an interim model from the accessed set of training fingerprints, the interim model containing a subset of the information in the set of training fingerprints to enable a destination device to genera prediction model to predict an availability of an access point, wherein the interim model is generated according to a type of prediction modeling the destination device is to generate and implement in predicting an availability of the access point; and
   transfer the generated interim model to the destination device.

2. The computing device according to claim 1, wherein the machine readable instructions are further to cause the processor to:
   transform the interim model from a first format to a second format, wherein the first format is a format compatible with the computing device and the second format is a format compatible with the destination device.

3. The computing device according to claim 1, wherein the machine readable instructions are further to cause the processor to:
   generate a prediction model from the accessed set of training fingerprints that is to be used to predict an availability of an access point, wherein the interim model differs from the generated prediction model.

4. The computing device according to claim 1, wherein, to generate the interim model, the machine readable instructions are further to cause the processor to:
   generate the interim model to include information that enables an accuracy at which the destination device is able to predict an availability of an access point to be similar to an accuracy at which the computing device is able to predict an availability of an access point through use of a prediction model generated from the access set of training fingerprints.

5. The computing device of claim 1, wherein the interim model transferred to the destination device is usable to generate a prediction model without performing a training procedure, wherein the prediction model is to predict an access point availability using the generated prediction model.

6. The computing device of claim 5, wherein the access point availability is predicted based on a cellular tower identifier and a cellular tower signal strength provided as input to the prediction model.

7. A method for enabling access point availability prediction in a destination device, said method comprising:
   accessing, by a processor, a set of training fingerprints, wherein each of the training fingerprints specifies an access point of a plurality of access points to which a mobile device successfully connected and a cellular signal strength of a cellular tower corresponding to the connection;
   generating, by the processor, an interim model containing a subset of the information in the accessed set of training fingerprints to enable a destination device to predict, based upon the information contained in the interim model, an availability of an access point, wherein the interim model is generated according to a type of prediction modeling the destination device is to generate and implement in predicting an availability of the access point; and
   transferring, by the processor, the generated interim model to the destination device.

8. The method according to claim 7, further comprising:
   transforming the interim model from a first format to a second format, wherein the first format s a format compatible with a source device and the second format is a format compatible with the destination device; and
   wherein transferring the generated interim model comprises transferring the transformed interim model to the destination device.

* * * * *